United States Patent
Kongo et al.

(10) Patent No.: US 11,118,291 B2
(45) Date of Patent: Sep. 14, 2021

(54) SEWING MACHINE, TERMINAL APPARATUS, SEWING MACHINE SYSTEM, INFORMATION GENERATING METHOD, DISPLAY METHOD, AND PROGRAM

(71) Applicant: JANOME SEWING MACHINE CO., LTD., Tokyo (JP)

(72) Inventors: Takeshi Kongo, Tokyo (JP); Hiromi Oda, Tokyo (JP)

(73) Assignee: JANOME SEWING MACHINE CO., LTD., Tokyo (JP)

( * ) Notice: Subject to any disclaimer, the term of this patent is extended or adjusted under 35 U.S.C. 154(b) by 376 days.

(21) Appl. No.: 16/212,753

(22) Filed: Dec. 7, 2018

(65) Prior Publication Data
US 2019/0203393 A1    Jul. 4, 2019

(30) Foreign Application Priority Data
Dec. 28, 2017    (JP) .............................. JP2017-253540

(51) Int. Cl.
*D05B 19/00*    (2006.01)
*D05B 19/08*    (2006.01)
(Continued)

(52) U.S. Cl.
CPC ........... *D05B 19/08* (2013.01); *D05B 19/006* (2013.01); *D05B 19/10* (2013.01); *G09B 5/02* (2013.01);
(Continued)

(58) Field of Classification Search
CPC .................. D05B 19/006; D05B 19/08; D05D 2205/085; D05D 21/00; G05B 19/106
See application file for complete search history.

(56) References Cited

U.S. PATENT DOCUMENTS 4,292,905 A * 10/1981 Widmer ............... D05B 19/006
112/470.04
4,704,974 A * 11/1987 Herdeg ................ A43D 119/00
112/470.04
(Continued)

FOREIGN PATENT DOCUMENTS

JP    2016-052421 A    4/2016

*Primary Examiner* — Tajash D Patel
(74) *Attorney, Agent, or Firm* — Nakanishi IP Associates, LLC

(57) ABSTRACT

An operation state ascertaining unit of a sewing machine ascertains an operation state of a sewing machine main body. A content information selection unit selects particular content information that corresponds to the operation state ascertained by the operation state ascertaining unit from among multiple content information stored in an operation-associated content information storage unit that stores multiple content information corresponding to the operation state. An instruction information appending unit appends additional information with respect to instruction content for the main body to the content information selected by the content information selection unit. A coding unit codes the selected content information to which the additional information has been appended by the instruction information appending unit. A display unit displays the content information coded by the coding unit. Subsequently, a reader unit of a terminal apparatus reads the coded content information, and a display unit displays the content thus read.

11 Claims, 10 Drawing Sheets

(51) Int. Cl.
   *G09B 19/20* (2006.01)
   *G09B 5/02* (2006.01)
   *D05B 19/10* (2006.01)
   *G06K 7/14* (2006.01)

(52) U.S. Cl.
   CPC ....... *G09B 19/20* (2013.01); *D05D 2205/085* (2013.01); *D05D 2205/18* (2013.01); *G06K 7/1417* (2013.01)

(56) References Cited

U.S. PATENT DOCUMENTS

| | | | |
|---|---|---|---|
| 2007/0233310 A1* | 10/2007 | Yamada | D05B 19/08 700/138 |
| 2011/0295410 A1* | 12/2011 | Yamada | D05B 19/08 700/138 |
| 2015/0345056 A1* | 12/2015 | Imaizumi | D05B 19/10 700/138 |
| 2016/0031108 A1* | 2/2016 | Bailie | D05B 19/08 700/134 |
| 2016/0060799 A1 | 3/2016 | Kongo | |

\* cited by examiner

USER ACQUIRES DESIRED "DESIGN NUMBER" USING TERMINAL APPARATUS

USER PRESSES QR CODE DISPLAY AREA ON SEWING MACHINE SO AS TO OPEN DIRECT SCREEN.
WHEN USER INPUTS "DESIGN NUMBER" ACQUIRED VIA TERMINAL PROCESSING APPARATUS, DESIGN SELECTION SCREEN IS DISPLAYED AND SEWING IS ENABLED.

SEWING MACHINE, TERMINAL APPARATUS, SEWING MACHINE SYSTEM, INFORMATION GENERATING METHOD, DISPLAY METHOD, AND PROGRAM

CROSS REFERENCE TO RELATED APPLICATIONS

This application is based on and claims the benefit of priority to Japanese Patent Application No. 2017-253540 filed on Dec. 28, 2017, the contents of which are hereby incorporated by reference in their entirety.

BACKGROUND OF INVENTION

Field of the Invention

The present invention relates to a sewing machine, a terminal apparatus, a sewing machine system, an information generating method, a display method, and a program.

Description of the Related Art

In recent years, the functions of sewing machines have been becoming more advanced, and accompanying this, the operations of such sewing machines have become complicated.

Such a sewing machine mounts a large-size color liquid crystal display unit or the like, which supports a graphical user interface. With the user interface, the function of each button is represented by an icon image. Alternatively, a help file is displayed in the form of a moving image so as to allow the user to easily learn the operation method.

However, such a help file supported in the form of a moving image cannot cover all the functions. Accordingly, user's manuals in the form of printed material have not been eliminated.

In particular, when the user uses a function that the user uses for the first time, such a user's manual remains indispensable. Also, such a user's manual is required for the user to master all the functions.

Furthermore, with such a user's manual in the form of printed material, the user is required to have the user's manual nearby, to find a target item from a table of contents or an index, and to search for such a target item while flipping the pages. This requires the user to perform troublesome operations.

In a case in which a help file has a keyword search function, link function, or the like, as with an online help system, the help file provides improved convenience for the user. However, with such an arrangement, the user must guess an appropriate keyword, type the keyword, and search for the required description until the target item is found while changing the keyword.

In order to address the issues described above, as a technique relating to Patent document 1, a system has been proposed, including a sewing machine and a terminal apparatus connected in a wireless manner. In this system, the terminal apparatus is configured to be capable of displaying the content of the user's manual or the like according to the state of the sewing machine.

RELATED ART DOCUMENTS

Patent Documents

[Patent document 1]
 Japanese Patent Application Laid Open No. 2016-052421

However, such a technique relating to Patent document 1 requires the sewing machine to include a wireless function. In a case in which the wireless function is implemented in the sewing machine in order to address only the above-described issues, the sewing machine requires a complicated hardware configuration, leading to an issue of a high cost. Furthermore, such a system requires troublesome settings such as settings for communication standard matching, settings for a communication environment, etc., which is an issue.

SUMMARY OF THE INVENTION

Accordingly, the present invention has been made in order to address the above-described issues. It is a purpose of the present invention to provide a sewing machine, a terminal apparatus, a sewing machine system, an information generating method, a display method, and a program configured to allow the user to browse desired items in a user's manual with high speed in a sure manner, while requiring only a low-cost configuration without a need to expand the hardware configuration of the sewing machine.

Embodiment 1

One or more embodiments of the present invention provide a sewing machine comprising: an operation state ascertaining unit that ascertains an operation state of a sewing machine main body; an operation-associated content information storage unit that stores multiple content information corresponding to the operation state; a content information selection unit that selects content information that corresponds to the operation state ascertained by the operation state ascertaining unit from among the multiple content information stored in the operation-associated content information storage unit; and an instruction information appending unit that appends information with respect to instruction content for the sewing machine main body to the content information selected by the content information selection unit.

Embodiment 2

One or more embodiments of the present invention provide the sewing machine comprising an instruction content validity judgment unit that judges a validity of instruction content for the sewing machine main body based on the operation state.

Embodiment 3

One or more embodiments of the present invention provide the sewing machine. The instruction information appending unit further appends information with respect to the validity of the instruction content for the sewing machine main body after the instruction information is judged by the instruction content validity judgment unit.

Embodiment 4

One or more embodiments of the present invention also provide the sewing machine. When a change occurs in an operation situation of the sewing machine main body or in the instruction content for the sewing machine main body, the instruction information appending unit updates the information with respect to the selected content information or the information with respect to the instruction content for the sewing machine main body according to the change that has occurred.

Embodiment 5

One or more embodiments of the present invention also provide the sewing machine. The sewing machine comprises a history information storage unit that stores, as history information, update information with respect to the content information or the information with respect to the instruction content for the sewing machine main body.

Embodiment 6

One or more embodiments of the present invention also provide the sewing machine. The instruction information appending unit appends the information with respect to the instruction content for the sewing machine main body to the selected content information based on the history information stored in the history information storage unit.

Embodiment 7

One or more embodiments of the present invention also provide the sewing machine. The sewing machine comprises a coding unit that codes the information generated by the instruction information appending unit by appending additional information to the selected content information.

Embodiment 8

One or more embodiments of the present invention also provide the sewing machine comprising a display unit that displays the coded information.

Embodiment 9

One or more embodiments of the present invention provide a terminal apparatus. The terminal apparatus comprises: an operation-associated content information storage unit that stores multiple content information corresponding to an operation state of a sewing machine; a content information selection unit that selects particular content information that corresponds to the operation state from among the multiple content information thus stored; and an instruction information appending unit that appends information with respect to instruction content for the sewing machine to the selected content information.

Embodiment 10

One or more embodiments of the present invention provide a sewing machine system comprising a sewing machine and a terminal apparatus. The sewing machine comprises: an operation state ascertaining unit that ascertains an operation state of a sewing machine main body; an operation-associated content information storage unit that stores multiple content information corresponding to the operation state; a content information selection unit that selects content information that corresponds to the operation state ascertained by the operation state ascertaining unit from among the multiple content information stored in the operation-associated content information storage unit; an instruction information appending unit that appends information with respect to instruction content for the sewing machine main body to the content information selected by the content information selection unit; a coding unit that codes the information generated by the instruction information appending unit by appending additional information to the selected content information; and a sewing-machine-side display unit that displays the information configured as a combination of the content information and the appended information after it is coded by the coding unit. The terminal apparatus comprises: a reader unit that reads the coded information configured as a combination of the content information and the appended information; and a terminal-side display unit that displays the content information and the appended information read by the reader unit.

Embodiment 11

One or more embodiments of the present invention provide a non-transitory recording medium that records a program for instructing a computer to execute an information generating method in a sewing machine comprising an operation state ascertaining unit, an operation-associated content information storage unit that stores multiple content information corresponding to an operation state, a content information selection unit, and an instruction information appending unit. The non-transitory recording medium stores a program for instructing a computer to execute: a first step in which the operation state ascertaining unit ascertains the operation state of a sewing machine main body; a second step in which the content information selection unit selects particular content information that corresponds to the operation state ascertained in the first step from among the multiple content information stored in the operation-associated content information storage unit; and a third step in which the instruction information appending unit appends information with respect to instruction content for the sewing machine main body to the content information selected in the second step.

With at least one embodiment of the present invention, this system can be configured as a low-cost arrangement that allows the user to quickly and appropriately browse a desired item in the user's manual without a need to expand the hardware configuration of the sewing machine.

DETAILED DESCRIPTION

Embodiment

Description will be made below regarding an embodiment of the present invention with reference to FIGS. 1 through 10.

[Configuration of Sewing Machine]

Description will be made with reference to FIG. 1 regarding a sewing machine system 10 according to the present embodiment.

Figure 1:
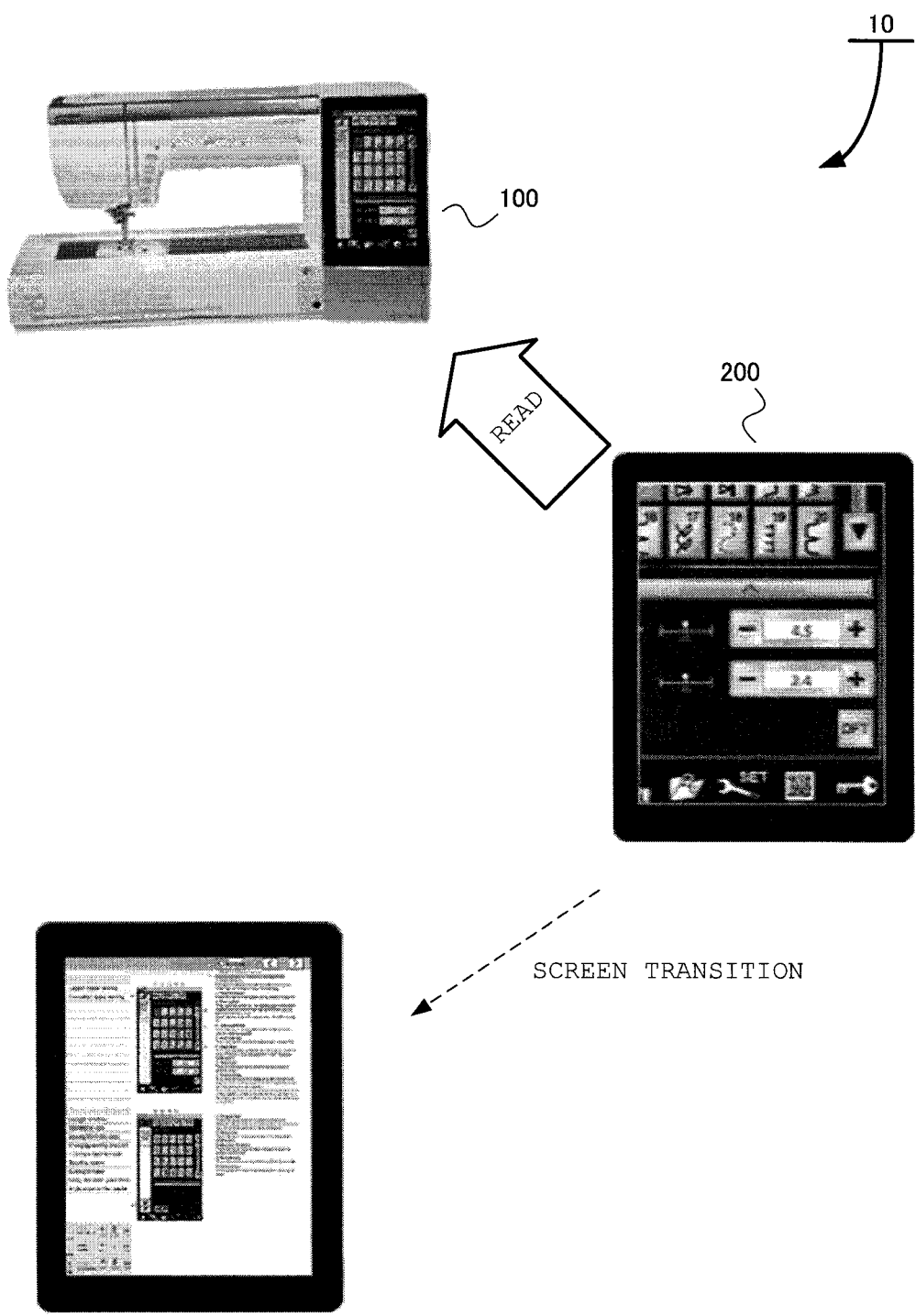
FIG. 1 is a diagram showing a configuration of a sewing machine system according to the present embodiment of the present invention.

As shown in FIG. 1, the sewing machine system 10 according to the present embodiment is configured including a sewing machine 100 and a terminal apparatus 200. With this arrangement, examples of the terminal apparatus 200 include a tablet terminal, a smartphone, and the like.

Description will be made in the present embodiment regarding an example in which a display unit of the sewing machine 100 displays a QR code (trademark) for example, and the terminal apparatus 200 is provided with a reader unit that reads the QR code.

It should be noted that the QR code as described below represents an example of an optically readable two-dimensional code. Examples of the QR code include a barcode, OCR (Optical Character Reader), and the like. In addition, an arrangement may be made in which the same kind of code information that can be acquired by a reader is displayed in the form of a graphic pattern.

More specifically, as shown in FIG. 1, the display unit configured as a liquid crystal panel of the sewing machine 100 displays a QR code. Subsequently, a reader unit of the terminal, e.g., a camera, captures an image of the QR code, and acquires the captured image.

After the terminal apparatus 200 starts up a dedicated application, the terminal apparatus 200 recognizes the QR code acquired in the form of an image, and acquires a screen code.

Subsequently, the terminal apparatus 200 displays a first-candidate explanation that corresponds to the acquired screen code. In addition, the terminal apparatus 200 further displays a second candidate and a third candidate in the form of a list.

Figure 10:
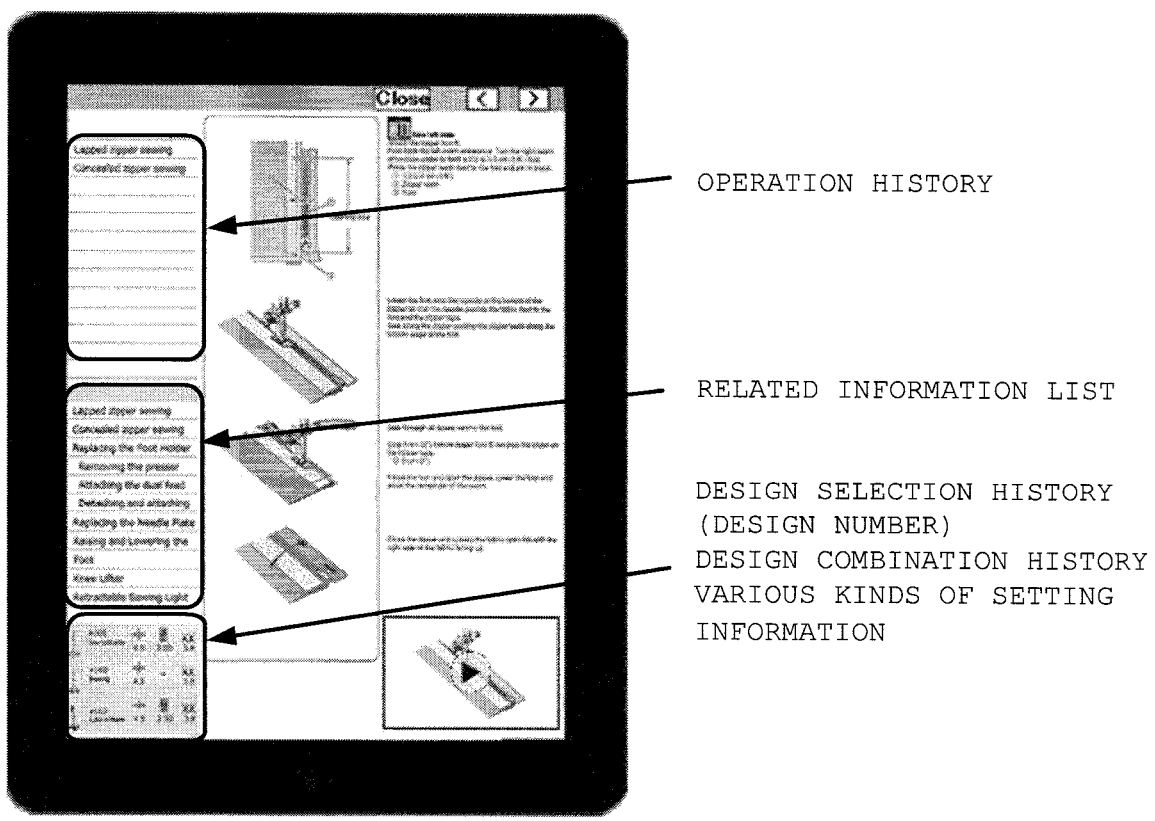
FIG. 10 is a diagram showing an example display displayed on the terminal apparatus included in the sewing machine system according to the present embodiment of the present invention after the operation ends.

In this case, the second candidate, the third candidate, etc., each represent the information displayed in a "related information list" shown in FIG. 10, and represents an item relating to the explanation displayed in the main screen or an item predicted as a next candidate.

For example, when an "upper feed mode ON" event has been recognized according to the user's operation, a terminal-side display unit of the terminal apparatus 200 side displays a "sewing method in the upper feed mode". In addition, the terminal-side display unit displays a "method for detaching a presser holder" as a second candidate, a "method for mounting a presser holder" as a third candidate, "suitable designs in the upper feed mode" as a fourth candidate, and the like.

Furthermore, the terminal-side display unit of the terminal apparatus 200 displays a browsing history including designs used in past sewing, the parameters set for such designs, and the like, in the form of a list. Here, the screen code represents an ID (e.g., value, number, character string, etc.) that indicates the kind of the screen. The screen codes are uniquely defined beforehand on the sewing machine 100 side and the terminal apparatus 200 side.

Description will be made below regarding an electrical configuration, characteristic functions, and operation of the sewing machine system 10.

[Electrical Configuration of Sewing Machine System]

Description will be made below regarding the electrical configuration of the sewing machine system 10 with reference to FIG. 2.

Figure 2:
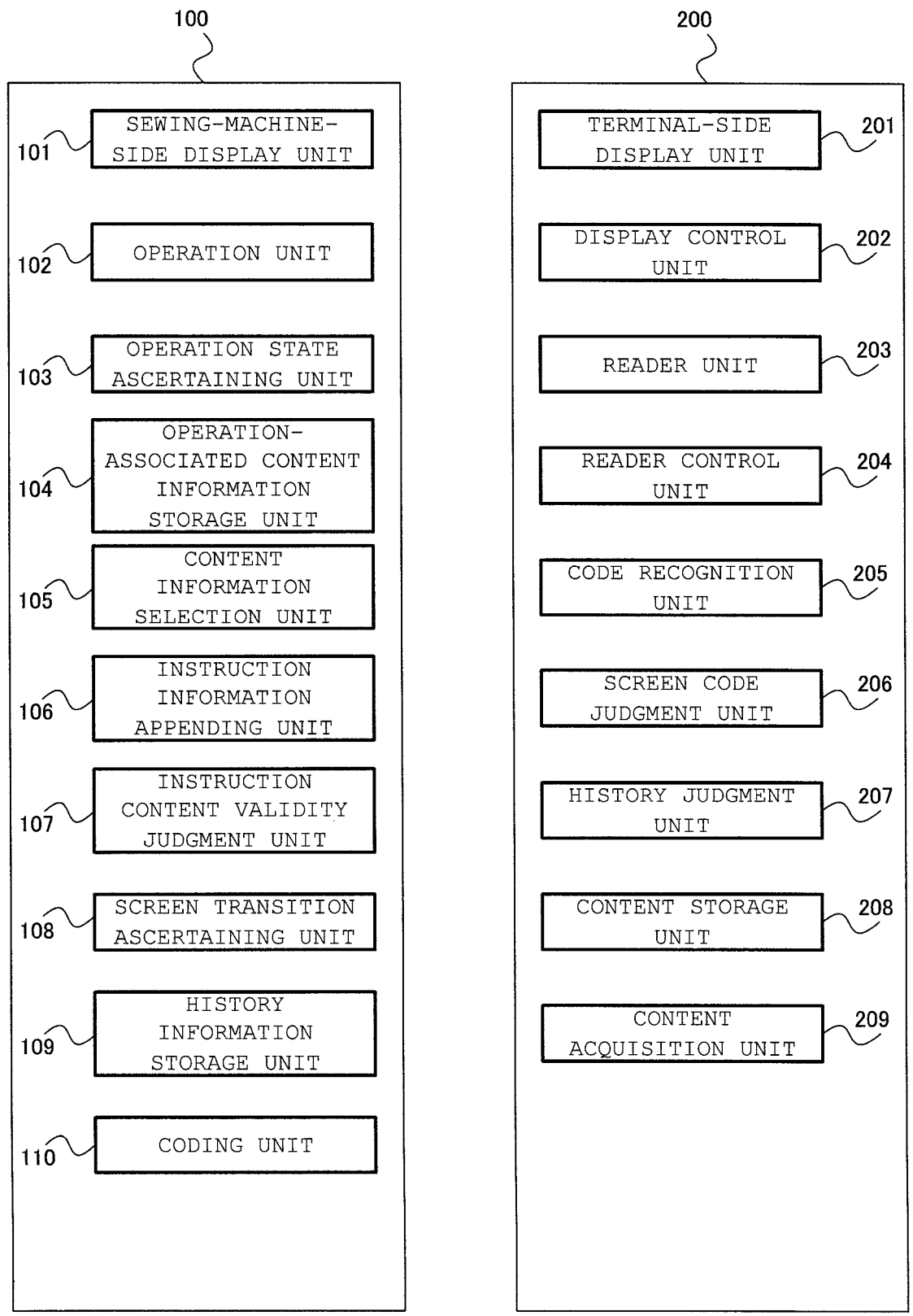
FIG. 2 is a diagram showing an electrical configuration of the sewing machine system according to the present embodiment of the present invention.

As shown in FIG. 2, the sewing machine 100 according to the present embodiment is configured including a sewing-machine-side display unit 101 that corresponds to a display unit, an operation unit 102, an operation state ascertaining unit 103, an operation-associated content information storage unit 104, a content information selection unit 105, an instruction information appending unit 106, an instruction content validity judgment unit 107, a screen transition ascertaining unit 108, a history information storage unit 109, and a coding unit 110.

The sewing-machine-side display unit 101 is configured as a liquid crystal panel, and is configured as a display apparatus that displays various kinds of information. In the present embodiment, the sewing-machine-side display unit 101 displays the screen code, information generated by the instruction information appending unit 106, as described later for example, as a combination of the selected content information and additional information with respect to an instruction supplied to the main body, etc.

In the following description in the present embodiment, the "content information" mainly includes the user's manual information in the form of content, and further includes file names each of which indicates the location of a supplementary image or moving image, and code information or the like associated with the user's manual information such as an index, reference page number, or reference line number.

The operation unit 102 is configured as a touch panel or the like, and receives a user's operation according to a touch operation by the user.

The operation state ascertaining unit 103 ascertains the operation state of the sewing machine main body. Examples of the operation state include a reverse stitching mode, basting mode, straight line stitching mode, embroidery stitching mode, and the like.

The operation-associated content information storage unit 104 is a storage device that stores multiple content information corresponding to the operation state.

The content information selection unit 105 selects the content information that corresponds to the operation state ascertained by the operation state ascertaining unit 103 from among the multiple content information stored in the operation-associated information storage unit 104.

The instruction information appending unit 106 appends the information with respect to the instructions for the main body to the content information selected by the content information selection unit 105. Examples of the "instructions for the main body" include various kinds of setting values, and more specifically, include various kinds of parameters such as a baseline, swing width, feed amount, thread tension balance, and the like.

Furthermore, the instruction information appending unit 106 appends, to the selected content information, the information with respect to the instruction content for the sewing machine main body including the information with respect to the validity of the instruction content for the sewing machine main body judged by the instruction content validity judgement unit 107 configured to judge the validity of the instruction content s for the main body based on the operation state.

Furthermore, when a change occurs in the operation state of the sewing machine main body or in the instruction content for the sewing machine main body, the instruction information appending unit 106 updates the instruction content with respect to the instructions for the sewing machine main body to be appended to the selected content information.

Moreover, the instruction information appending unit 106 appends the information with respect to the instruction content for the sewing machine main body to the selected content information based on the history information stored in the history information storage unit 109 described later. It should be noted that, in a case in which the information is downloaded from a website, URL information or the like may be appended.

The screen transition ascertaining unit 108 holds an operation memory area for storing the screen operation history operated by the user.

The history information storage unit 109 stores, as the history information, the updated information with respect to the content information or the updated information with respect to the instruction content for the sewing machine main body.

The coding unit 110 codes the information generated by the instruction information appending unit by appending the additional information to the content information selected by the content information selection unit 105. It should be noted that the information thus coded is displayed on the sewing-machine-side display unit 101.

The terminal apparatus 200 is configured including a terminal-side display unit 201, a display control unit 202, a reader unit 203, a reader control unit 204, a code recognition unit 205, a screen code judgement unit 206, a history judgment unit 207, a content storage unit 208, and a content acquisition unit 209.

The terminal-side display unit 201 is configured as a liquid crystal panel, and is configured as a display apparatus that displays various kinds of information. It should be noted that, in the present embodiment, examples of such various kinds of information to be displayed include an explanation that corresponds to a screen code, a related information list, design selection history information, design combination history information, various kinds of setting information, and the like.

The display control unit 202 controls the display operation of the terminal-side display unit 201.

Specifically, the display control unit 202 controls the display operation for switching the screen displayed on the terminal apparatus 200 according to the operation state of the sewing machine 100. Furthermore, the display control unit 202 controls the display operation such that the operation history, the related information list, the design selection history information, the design combination history information, and various kinds of setting information, etc., are each displayed in a predetermined region.

The reader unit 203 reads the screen code displayed on the sewing-machine-side display unit 101, e.g., a QR code. It should be noted that examples of the reader unit 203 include a camera built into a tablet terminal or a smartphone.

The reader control unit 204 controls the reader unit 203. In the present embodiment, the reader control unit 204 controls a camera. The code recognition unit 205 recognizes, as a QR code, the information read by the camera configured as the reader unit 203.

The screen code judgment unit 206 converts the QR code thus read into a screen code associated beforehand with the sewing machine 100.

The history judgment unit 207 extracts a history with respect to screen transition, a design number associated with a design that has been sewn, parameter information, etc., based on the information acquired from the sewing machine 100.

The content storage unit 208 stores various kinds of content with respect to explanations in the user's manual.

The content acquisition unit 209 acquires, from the content storage unit 208, the content that corresponds to the screen code converted by the screen code judgment unit 206. Furthermore, the content acquisition unit 209 outputs the content thus acquired to the display control unit 202.

It should be noted that the information acquired, based on various kinds history information acquired from the sewing machine 100, via the content acquisition unit 209 from the content storage unit 208 prepared beforehand in the terminal apparatus 200, is used to display an explanation screen on the terminal-side display unit 201 of the terminal apparatus 200 or is used to display a sewn design history list.

[Screen Code Display Function by Ascertaining Sewing Machine State Transition]

The information such as the screen ID that corresponds to the screen displayed on the sewing machine and design management number is defined as information shared by the sewing machine and the terminal apparatus. When the screen transits according to the user's operation for the sewing machine, the information such as a screen ID or the like that corresponds to the screen after the transition is stored in the operation memory area. The screen code is generated by connecting the history of information such as the screen ID, etc. thus stored. Description will be made with reference to FIGS. 3 through 6 regarding a screen code display function based on the state transition ascertained by the sewing machine 100 in the sewing machine system 10 according to the present embodiment.

In an ordinary design sewing mode, in order to provide beautiful sewing, multiple kinds of adjustment values are prepared, examples of which include the baseline, swing width, feed amount, thread tension balance, and the like. There is a difference in the optimum adjustment value between the kinds of cloth (e.g., thick cloth, thin cloth, knit fabric, organdy, lace, etc.) to be used by the user.

In the start of the sewing, the sewing machine 100 has a function of measuring the thickness of a cloth, and of automatically adjusting the presser bar pressure. However, the sewing machine 100 is not capable of detecting the stretchability of the cloth itself. Accordingly, the sewing machine 100 requires the user to select the properties of the cloth in order to enable optimum sewing.

Furthermore, designs suitable for a particular kind of cloth are known. That is to say, the sewing machine 100 requires the setting values to be changed according to the cloth selected by the user even in a state in which a given design has been selected.

Figure 3:
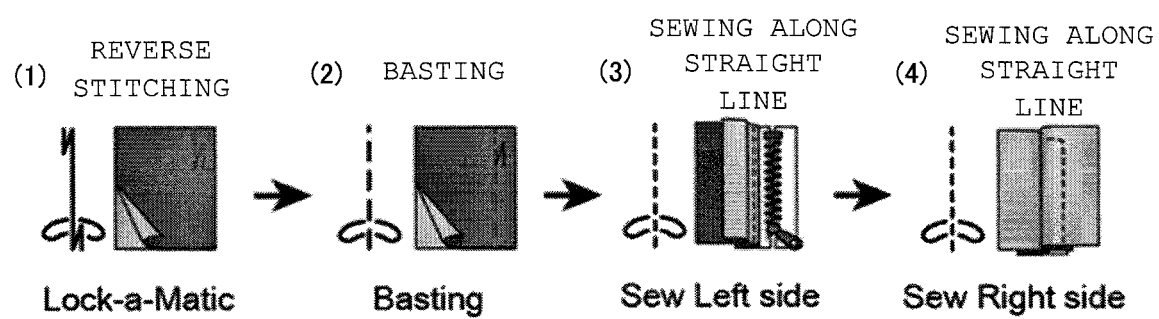
FIG. 3 is a diagram showing an example of sewing for describing a function of the sewing machine system according to the present embodiment of the present invention.

In a case in which a fastener is to be sewn, a typical procedure is (1) reverse stitching, (2) basting, (3) sewing along a straight line, . . . , in this order, as shown in FIG. 3. In a stage in which (3) "sewing in a straight line" is selected, it is difficult, based on the latest state in which the straight-line design has been selected, to judge the current situation from among a situation in which the user has simply selected the straight-line design and a situation in which the straight-line design has been selected as an intermediate step in sewing a fastener.

Description will be made below regarding an example in the latter situation. After the sewing machine 100 is started up, the screen ID [101] of a second screen (e.g., usage selection screen) is stored in the operation memory area according to the user's operation (e.g., pressing a usage selection key) via a first screen (TOP screen).

When the screen transits from the first screen (TOP screen) to the second screen (e.g., usage selection screen), the image ID history (only [101]) is combined, and the screen code [101] is generated. Subsequently, a QR code is generated based on the screen code, and the QR code thus generated is displayed on the second screen. Subsequently, when the user performs a further operation (the zipper key is pressed, for example), the screen ID [005] of a third screen (e.g., zipper sewing screen) is stored in the operation memory area.

When the screen transits from the second screen (e.g., usage selection screen) to the third screen (e.g., zipper sewing screen), the history of the screen IDs ([101] and [005]) are combined, and a screen code [101-005] is generated. Subsequently, a QR code is generated based on the screen code thus generated, and the QR code is displayed on the third screen.

Subsequently, a design management number [#002] that corresponds to the fourth screen (reverse stitching design selection screen) is stored in the operation memory area according to the user's operation (reverse stitching selection operation (1) in the zipper sewing procedure).

Subsequently, after the screen transits from the third screen (e.g., zipper sewing screen) to the fourth screen (e.g., reverse stitching design selection screen), as shown in the following table 1, the information history of the screen IDs etc., ([101], [005], and [#002]) are combined, and a screen code [101-005-#002] is generated. Subsequently, a QR code is generated based on the screen code thus generated, and the QR code is displayed on the fourth screen.

TABLE 1

| | |
|---|---|
| #002 | DESIGN MANAGEMENT NUMBER OF REVERSE STITCHING DESIGN SELECTION |
| 005 | USAGE ZIPPER SCREEN ID |
| 101 | USAGE SELECTION TOP SCREEN ID |

As described above, the screen transition (history) of the sewing machine 100 is stored and ascertained with the user's operation as a trigger. Furthermore, the screen transition information is stored as a screen code in the operation memory area.

Subsequently, a QR code is generated based on the character string (screen code) generated by connecting the information acquired from the operation memory area. That is to say, a series of operations are executed so as to display the QR code on a sewing-machine-side display unit 101 of the sewing machine 100.

It should be noted that the screen code is not restricted to the screen transition information. Also, examples of such information stored as the screen code include a selected design number and various kinds of setting values (baseline, swing width, feed amount, thread tension balance, presser bar pressure, cloth thickness, two-needle mode, etc.), information with respect to a monogram character string, combined ornamental designs, etc., input by the use, sewing machine sensor information for judging the kind of a mounted needle plate, and the like.

It should be noted that the amount of information that can be embedded in the QR code is limited. Accordingly, compressed information may be embedded in the QR code, for example.

Upon reading the QR code displayed on the sewing machine 100, a corresponding explanation screen, the browsing history of the selected designs, or the like, is displayed on the specified terminal-side display unit 201 of the terminal apparatus 200 according to the screen code thus recognized.

Figure 4:
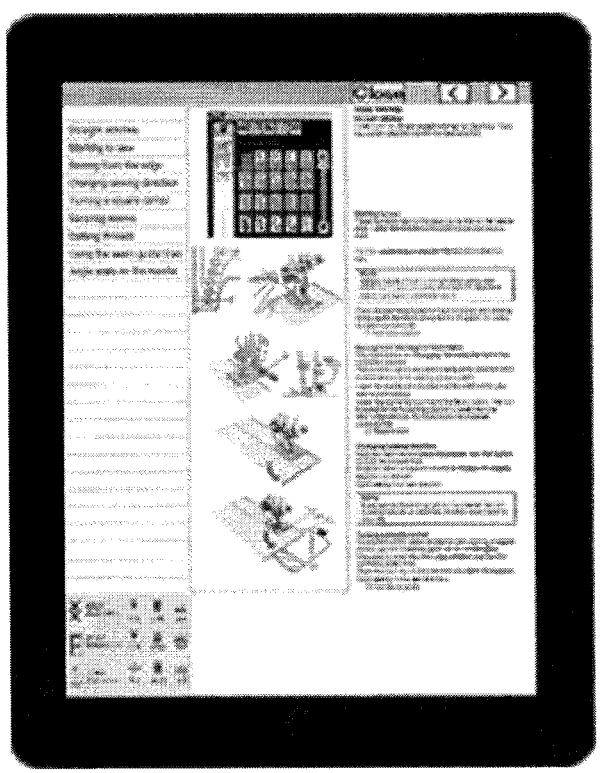
FIG. 4 is diagram showing an example display in the sewing machine system according to the present embodiment of the present invention when a basic sewing explanation of a straight-line design is displayed.
Figure 5:
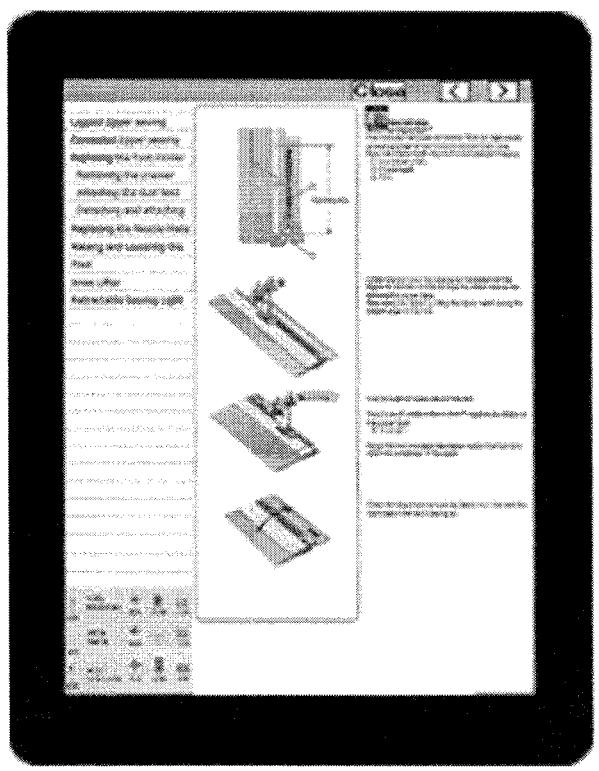
FIG. 5 is a diagram showing an example display in the sewing machine system according to the present embodiment of the present invention when a detailed explanation is displayed with respect to a fastener sewing procedure.

By transmitting the screen transition information from the sewing machine 100 to the terminal apparatus 200 via the screen code, judgement can be made regarding whether or not a basic sewing explanation screen for a straight-line design as shown in FIG. 4 is to be displayed or a detailed explanation screen for a fastener sewing procedure as shown in FIG. 5 is to be displayed. Such an arrangement provides the user with an optimum explanation screen.

Furthermore, this arrangement allows various kinds of setting values (baseline, swing width, feed amount, thread tension balance, etc.) to be stored and confirmed.

[Expansion Function for Screen Code]

Ordinary sewing machine models are known that support 400 or more kinds of stitches (designs). In a case in which the sewing-machine-side display unit 101 has a liquid crystal display with a small size or limited resolution, when the user selects a desired design from a list of the multiple designs as described above, the user must browse and search for the desired design over multiple pages. Such a search operation is troublesome.

Also, as the sewing machine 100, sewing machine models are known in which the list of designs is printed in the form of a simplified design chart on the top plate. However, the printable area is limited, leading to an issue in that each design must be printed with a small size, which is difficult to see for elderly people.

Description has been made in the present embodiment regarding an example in which a QR code is employed as a medium that transmits information from the sewing machine 100 to the terminal apparatus 200. However, there is no medium that allows the information of the terminal apparatus 200 side to be transmitted to the sewing machine 100. In order to address such an issue, upon pressing a button, this arrangement is configured to allow the user to input information manually as described below in detail. The QR code display region is employed as the button.

It should be noted that, as "screen code information expansion", such an arrangement may have a function for displaying the QR code with a large size (function of expanding the amount of information that can be supplied to the terminal apparatus 200).

With the terminal apparatus 200 according to the present embodiment, the design selected via the terminal apparatus 200 is associated in advance with a unique design number that is also defined in the sewing machine 100. Accordingly, as shown in FIG. 6, when the user presses the display area of the screen code on the sewing machine 100, this arrangement allows the user to directly select a desired design.

Figure 6:
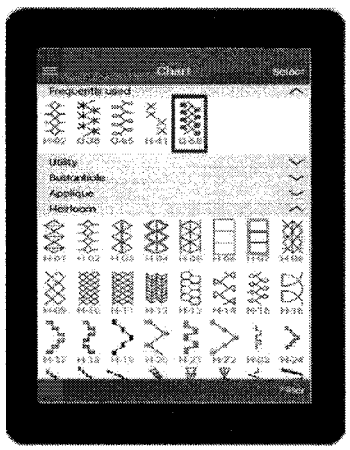
FIG. 6 is a diagram showing an example procedure for allowing designs to be directly selected, as employed in the sewing machine system according to the present embodiment of the present invention.
Figure 6:
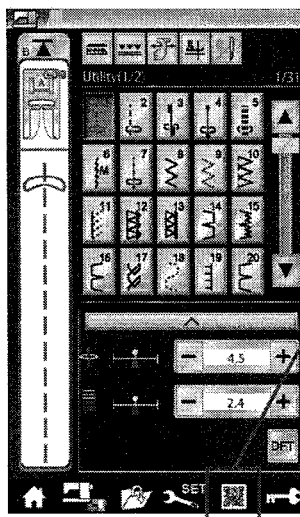
Figure 6:
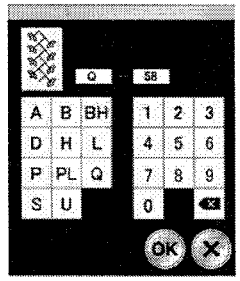
Figure 6:
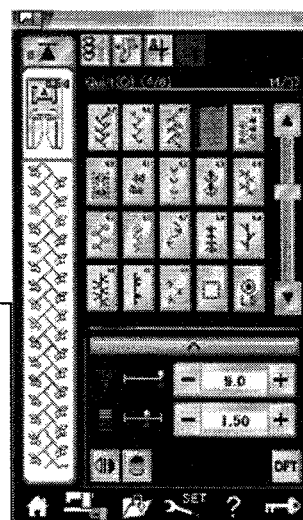

Specifically, as shown on the upper-left side in FIG. 6, the user acquires a desired "design number" using the terminal apparatus 200. Subsequently, as shown on the lower-left side in FIG. 6, when the user presses the QR code display area of the sewing-machine-side display unit 101, a direct input screen as shown on the lower-central side in FIG. 6 is displayed on the sewing-machine-side display unit 101.

Furthermore, when the user inputs, via the direct input screen, the "design number" thus acquired via the terminal apparatus 200, the design selection screen is displayed on the sewing-machine-side display unit 101, and the sewing is enabled.

It should be noted that the terminal apparatus 200 may have a filtering function by design category (e.g., button hole category, quilting category, ornamental design category, etc.), and a function of allowing the user to easily select a designed design from the user's registered favorites.

[Operation of Sewing Machine System]

Description will be made below with reference to FIGS. 7 through 10 regarding the operation of the sewing machine system 10 according to the present embodiment. Description will be made separately regarding the operation of the sewing machine 100 and the operation of the terminal apparatus 200.

[Operation of Sewing Machine]

Figure 7:
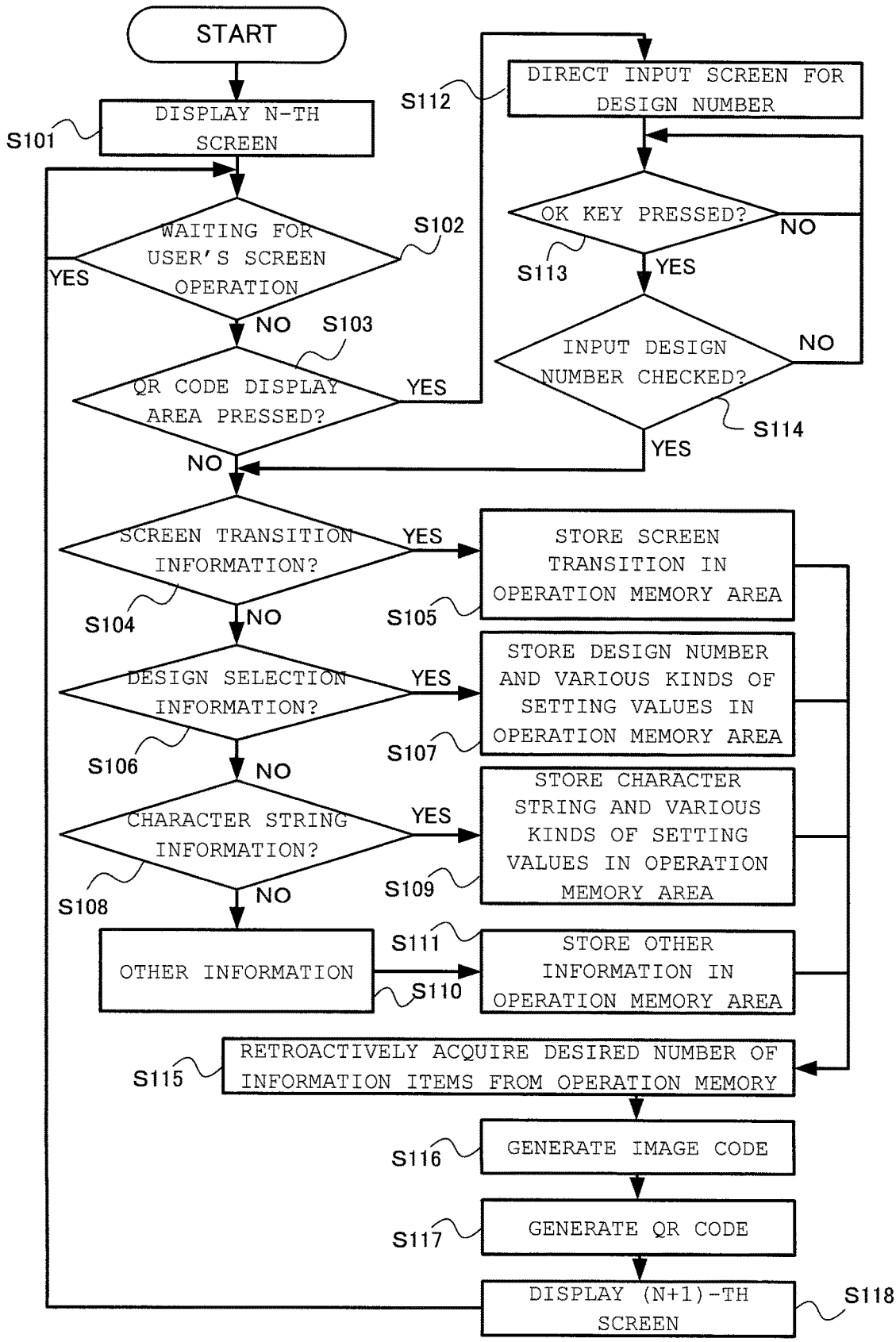
FIG. 7 is a flowchart showing the operation of a sewing machine included in the sewing machine system according to the present embodiment of the present invention.

Description will be made regarding the operation of the sewing machine 100 with reference to FIG. 7.

Description will be made below assuming that the sewing-machine-side display unit 101 displays the N-th screen (Step S101). When the sewing machine 100 detects the screen operation performed by the user in Step S102 (NO in Step S102), judgment is made regarding whether or not the user's operation matches the pressing operation in which the user presses the QR code display area displayed on the sewing-machine-side display unit 101 (Step S103).

Conversely, when the sewing machine 100 has not detected the screen operation performed by the user in Step S102 (YES in Step S102), judgment is made that waiting for the user's screen operation is to be continued, and the flow returns to Step S102.

When judgement is made in Step S103 that the user's operation matches the pressing operation in which the user presses the QR code display area displayed on the sewing-machine-side display unit 101 (YES in Step S103), the sewing-machine-side display unit 101 displays the direct input screen for inputting the design number (Step S112). In this stage, judgment is made regarding whether or not the user has pressed the "OK" key (Step S113).

When judgment has been made that the user has pressed the "OK" key ("YES" in Step S113), the design number thus input is checked (Step S114). When the design number thus input is valid (YES in Step S114), the flow proceeds to Step S104.

Conversely, when judgment has been made that the user has not pressed the "OK" key (NO in Step S113), or when judgment has been made that the design number thus input is not valid (NO in Step S114), the flow returns to Step S113.

When judgment has been made in Step S103 that the user's operation does not match the pressing operation in which the user presses the QR code display area displayed on the sewing-machine-side display unit 101 (NO in Step S103), the flow proceeds to Step S104, and judgement is made regarding the presence or absence of the screen transition information (Step S104).

When the screen transition information has been judged to be present in Step S104 (YES in Step S104), the screen transition information is stored in the operation memory area (Step S105). Conversely, when the screen transition information has been judged to be absent in Step S104 (NO in Step S104), judgement is made regarding the presence or absence of the design selection information (Step S106).

When the design selection information has been judged to be present in Step S106 (YES in Step S106), the design number and various kinds of setting values are stored in the operation memory area (Step S107).

Conversely, when the design selection information has been judged to be absent in Step S106 (NO in Step S106), judgment is made regarding the presence or absence of the character string information (Step S108).

When the character string information has been judged to be present in Step S108 (YES in Step S108), the character string and various kinds of setting values are stored in the operation memory area (Step S109). Conversely, when the character string information has been judged to be absent in Step S108 (NO in Step S108), other information is acquired (Step S110), and this other information thus acquired is stored in the operation memory area (Step S111).

It should be noted that predetermined regions are defined in the operation memory area. The information (e.g., screen transition information, design selection information, character string information, etc.) that corresponds to the user's operation (event) is stored in the predetermined region as necessary in a FIFO manner.

In Step S115, a given number of information items are retroactively acquired from the operation memory area that stores the information (e.g., screen transition information, design selection information, character string information, etc.) stored in Steps S105 through S111 according to the user's operation (event) (Step S115).

Subsequently, the screen code is generated based on the information acquired in Step S115 (Step S116). Specifically, information is generated based on the information stored in the operation memory area, i.e., the screen code defined beforehand, the design number used by the user in sewing, and various kinds of setting information. The information thus generated is connected and converted into a character string so as to generate a screen code.

Subsequently, the QR code is generated based on the screen code configured as a character string (Step S117). The QR code thus generated in Step S117 is updated in the (N+1)-th screen, and the QR code thus updated is displayed on the sewing-machine-side display unit 101 (Step S118). In this stage, the flow returns to Step S102.

As described above, this arrangement provides such operations in which the QR code chances as necessary according to the user's operation. It should be noted that, when the sewing machine 100 operates with a screen transition, the QR code is displayed on a switched screen after the screen transition. On the other hand, when the sewing machine 100 operates without screen transition, the QR code is updated as appropriate according to the user's operation.

Furthermore, the QR code displayed on the sewing-machine-side display unit 101 of the sewing machine 100 allows the user to easily select 400 or more kinds of stitches (designs), which is referred to as the "direct selection function", in addition to allowing the information to be supplied to the terminal apparatus 200.

That is to say, when judgment has been made in Step S103 that the user has pressed the QR code display area displayed on the sewing-machine-side display unit 101 of the sewing machine 100, in Step S112, the direct input screen for inputting the design number is displayed on the screen of the sewing-machine-side display unit 101 of the sewing machine 100. After the user selects a desired design via the terminal apparatus 200 based on the design structure and the condition, the user inputs the corresponding design number via the direct input screen of the sewing machine 100 side. When the user determines the design in Step S113, the corresponding design information is acquired. The design selected via the terminal apparatus 200 is subjected to the design selection operation in Step S106. Subsequently, in Step S118, the design is displayed on the screen of the sewing-machine-side display unit 101 of the sewing machine 100. Immediately after this operation, this arrangement provides an environment that enables sewing.

[Operation of Terminal Apparatus]

Figure 8:
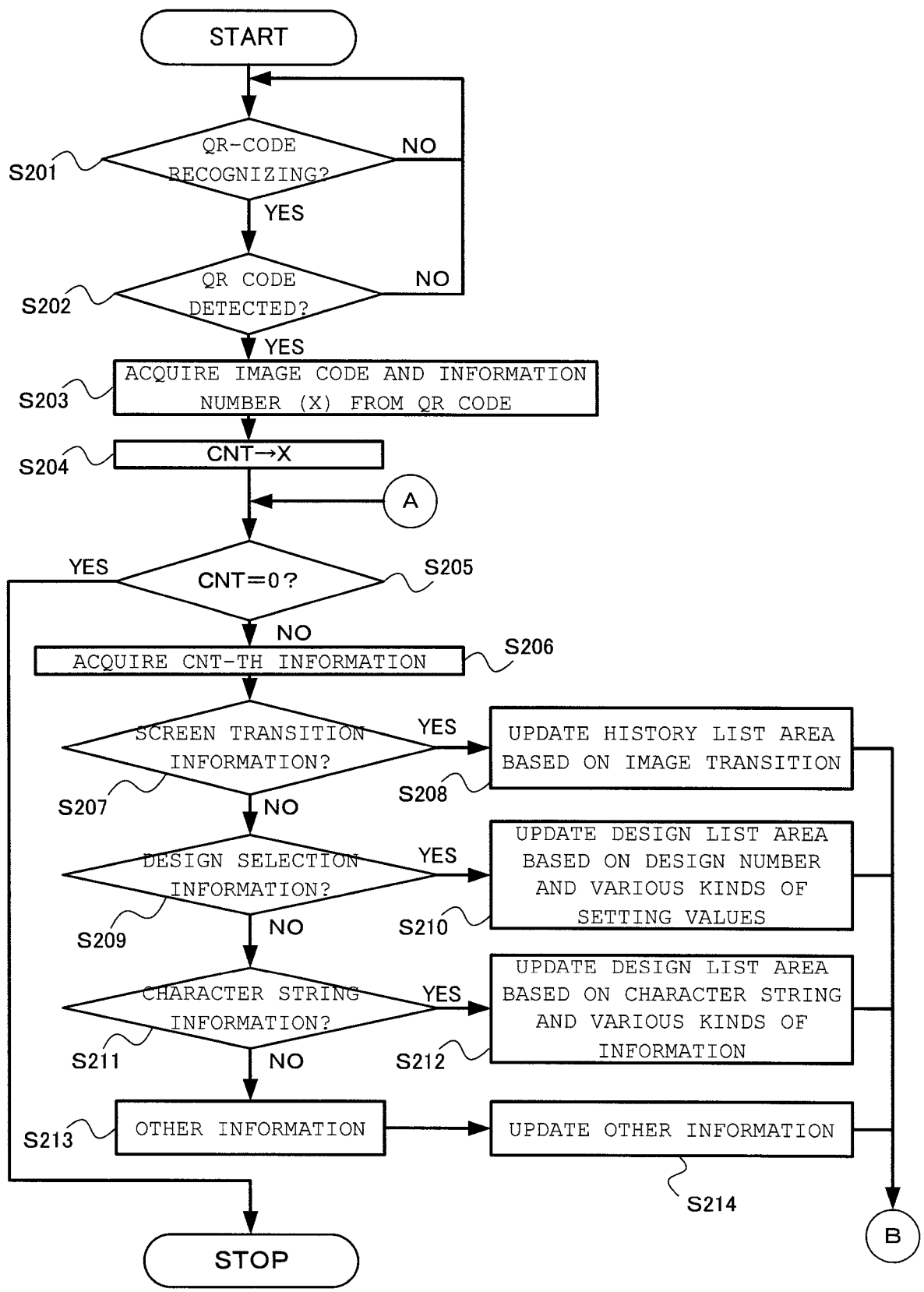
FIG. 8 is a flowchart showing the operation of a terminal apparatus included in the sewing machine system according to the present embodiment of the present invention.
Figure 9:
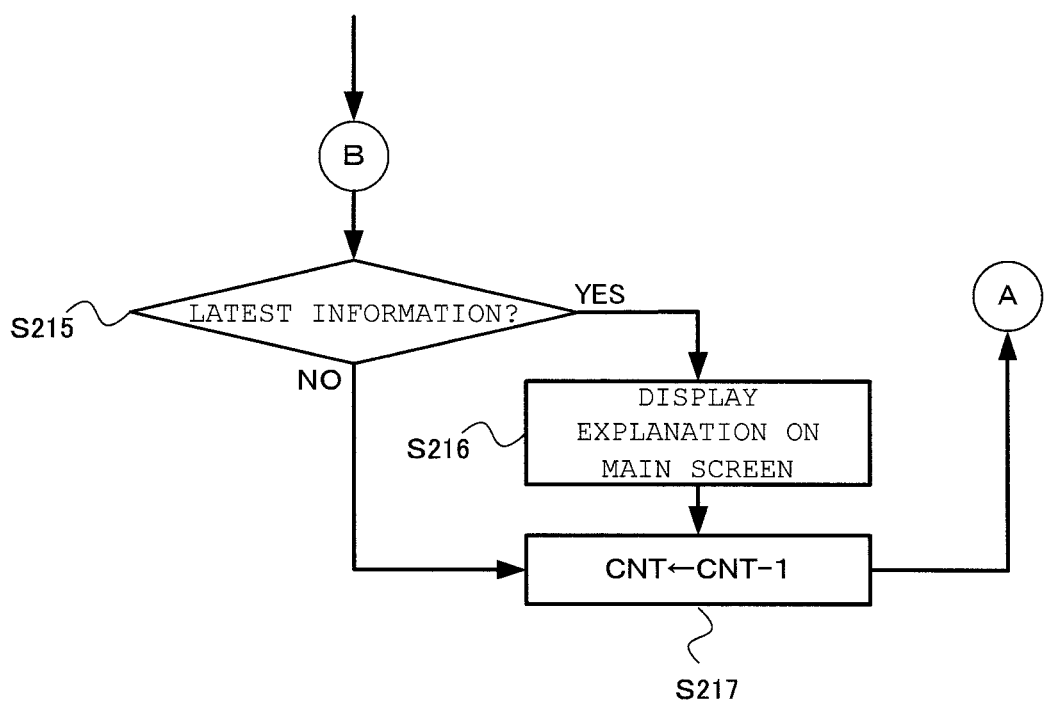
FIG. 9 is a flowchart showing the operation of the terminal apparatus included in the sewing machine system according to the present embodiment of the present invention.

Description will be made regarding the operation of the terminal apparatus 200 with reference to FIGS. 8 through 10.

Upon starting up a corresponding application in the terminal apparatus 200, the camera is started up, and QR code recognition is started (Step S201). When no QR code is recognized (NO in Step S201), the flow returns to Step S201.

It should be noted that the startup operation of the camera may be performed as necessary in order to notify the user of the QR code recognition.

On the other hand, when the QR code has been recognized (YES in Step S201), judgment is made regarding whether or not the QR code has been detected (Step S202). When the QR code has not been detected (NO in Step S202), the flow returns to Step S201.

On the other hand, when the QR code has been detected (YES in Step S202), the screen code and the information number (X) are acquired from the QR code (Step S203).

Subsequently, in order to separate the information connected on the sewing machine 100 side, a counter is prepared for ascertaining the information number (X). The information number X is set for the counter as a counter value (Step S204).

The operation is continued until no separated information remains (until the counter becomes zero). Specifically, judgement is made in the operation regarding whether or not the counter value becomes zero (Step S205). When judgment has been made that the counter value becomes zero (YES in Step S205), the operation is suspended.

With this arrangement, the QR code includes the information with respect to the screen transition history (e.g., screen ID or the like defined beforehand), design parameters used in sewing (e.g., the baseline, swing width, feed amount, thread tension balance, etc.), etc. The information (e.g., a number such as the screen ID, character string, etc.) is stored in the operation memory area as necessary according to the user's operation. The information is stored in the form of a connected character string having information sections clearly defined by a "comma" or the like.

Accordingly, in order to specify the amount of information stored in the connected character string, data that indicates the "number of information items" is appended at the head (header) of the connected character string. With the terminal apparatus 200 side, the information sections defined by "commas" are acquired from the connected character string based on the "number of information items" stored in the head (header) of the character string acquired from the QR code.

On the other hand, when judgment has been made that the counter value does not match zero (NO in Step S205), the separated information section indicated by the identification number (CNT) is acquired (Step S206), and information acquisition processing is performed as necessary for the latest information. Specifically, judgement is made regarding whether or not the separated information section indicated by the identification number (CNT) matches the screen transition information (Step S207). When judgement has been made that the separated information section matches the screen transition information (YES in Step S207), the history list area is updated based on the screen transition information.

On the other hand, when judgement has been made that the separated information section indicated by the identification number (CNT) does not match the screen transition information (NO in Step S207), judgment is made regarding whether or not the separated information section indicated by the identification number (CNT) matches the design selection information (Step S209).

When the separated information section indicated by the identification number (CNT) matches the design selection information (YES in Step S209), the design list area is updated and displayed based on the design number and various kinds of setting values (Step S210).

On the other hand, when judgment has been made that the separated information section indicated by the identification number (CNT) does not match the design selection information (NO in Step S209), judgment is made regarding whether or not the separated information section indicated by the identification number (CNT) matches the character string information (Step S211).

When judgment has been made that the separated information section indicated by the identification number (CNT) matches the character string information (YES in Step S211), the design list area is updated and displayed based on the character string and various kinds of setting values (Step S212).

On the other hand, when judgment has been made that the separated information section indicated by the identification number (CNT) does not match the character string information (NO in Step S211), other information is acquired (Step S213), and this other information is updated (Step S214).

Subsequently, judgment is made regarding whether the information thus acquired, i.e., the screen transition information, the design selection information, or the character string information, matches its latest information (Step S215). When judgment has been made that the information thus acquired matches its latest information (YES in Step S215), an explanation is displayed on the terminal-side display unit 201 of the terminal apparatus 200 (Step S216), and the counter value is decremented by 1. Subsequently, the flow returns to Step S205.

On the other hand, when judgment has been made that the information thus acquired, i.e., the screen transition information, the design selection information, or the character string information, does not match its latest information (NO in Step S215), the counter value is decremented by 1 (Step S217), and the flow returns to Step S205.

It should be noted that, in a stage in which the explanation that corresponds to the screen code acquired from the sewing machine 100 is displayed on the terminal-side display unit 201, the next-candidate screen code may be acquired from the screen codes registered in a table based on the search history information. Also, the name of the corresponding explanation screen may be acquired. Also, the above-described operation may repeatedly be performed the same number of times as the number of the next-candidate screen codes registered in the table. Also, the names of the next-candidate screen codes may be displayed on a sub-screen in the form of a list.

It should be noted that, as shown in FIG. 10, the information with respect to the latest screen transition is displayed as an explanation screen on the terminal-side display unit 201 of the terminal apparatus 200. Furthermore, in addition to the operation history area for displaying the operation history, the terminal-side display unit 201 has a design selection history area for displaying the input information with respect to a design or a monogram selected by the user.

Also, the item relating to the explanation displayed on the terminal-side display unit 201 or the item that is predicted as the next candidate may be displayed in the form of a related information list.

As described above, the present embodiment can be configured as a low-cost arrangement that allows the user to quickly and appropriately browse a desired item in the user's manual without a need to expand the hardware configuration of the sewing machine.

Furthermore, with the present embodiment, in order to display an explanation of the corresponding function on the terminal apparatus, this system only requires the user to hold the camera of the terminal apparatus over the screen of the sewing machine. Furthermore, this arrangement allows the user to read an explanation with respect to the current operation for the sewing machine and to view an illustration (including a moving image). Furthermore, this arrangement allows the user to trace the past history so as to acquire information with respect to the reference history of the explanations and the parameters of the designs used in the past.

Furthermore, with the present embodiment, the second candidate, the third candidate, . . . , of the related items are displayed in the form of a list. Accordingly, in order to allow the user to view a detailed description of each candidate item, this system only requires the user to select a desired item.

Furthermore, this system does not require the user to search for a suitable detailed explanation in a step-by-step fashion, unlike a printed user's manual or otherwise an online help system. Instead, the first candidate and the next candidate of the detailed explanations are displayed on a tablet terminal, a smartphone, or the like. Accordingly, this system only requires the user to select such a candidate. Furthermore, this system provides such an explanation to the user without a troublesome operation, for a user who has not read the user's manual because of a troublesome operation in searching for a relevant item. Accordingly, this system assists the user so as to prevent the occurrence of a situation in which the user cannot operate the sewing machine due to not looking at the user's manual.

Furthermore, with the present embodiment, the region in which the QR code or barcode is displayed also has an additional function as a button. When the user presses this region that functions as a button, this arrangement opens a direct selection dialog for selecting a design, or displays a fixed explanation stored in the sewing machine 100.

Also, an arrangement may be made in which each screen code is not uniquely associated with a screen to be displayed. Also, the screen code may be changed according to a situation of the screen transition (history of screen transition or the like). This allows the content of the explanation to be changed, thereby allowing the explanation to approach a user's desired explanation.

Description has been made in the present embodiment regarding an example in which the sewing machine 100 is provided with: the operation state ascertaining unit 103 that ascertains the operation state of the main body; the operation-associated content information storage unit 104 that stores multiple content information associated with the respective operation states; the content information selection unit 105 that selects the content information that corresponds to the operation state ascertained by the operation state ascertaining unit from among the multiple content information stored in the operation-associated content information storage unit; and the instruction information appending unit 106 that appends the information with respect to the instruction content for the main body to the content information selected by the content information selection unit. However, the present invention is not restricted to such a sewing machine 100. Also, another separate apparatus may be provided with: the operation-associated content information storage unit 104 that stores multiple content information associated with the respective operation states; the content information selection unit 105 that selects the content information that corresponds to the operation state ascertained by the operation state ascertaining unit from among the multiple content information stored in the operation-associated content information storage unit; and the instruction information appending unit 106 that appends the information with respect to the instruction content for the main body to the content information selected by the content information selection unit. Also, the information generated by the instruction information appending unit 106 may be supplied to other apparatuses.

It should be noted that, as a method for using the system, the user inputs the information with respect to the state of the sewing machine or the instruction information for the sewing machine to the terminal apparatus by a manual operation or the like. By inputting such information, the instruction information for the sewing machine is appended to the content information that corresponds to the state of the sewing machine. This arrangement is capable of generating the information by appending the instruction information for the sewing machine to the content information that corresponds to the state of the sewing machine without involving a special communication network.

Furthermore, by displaying the information thus generated on the display unit of the terminal apparatus, this system allows the information with respect to the current operation of the sewing machine to be displayed for the user.

Moreover, a change of the operation situation of the sewing machine and the updated information that corresponds to a change in the content of an instruction for the sewing machine are stored as the history information. Accordingly, this system allows the information reflected by the updated information to be displayed on the display unit of the terminal apparatus.

It should be noted that the operation of the sewing machine system may be recorded on a computer-system-readable recording medium in the form of a program. Also, such a program thus recorded on the recording medium may be read out and executed by the sewing machine and the terminal apparatus, thereby providing the sewing machine system according to the present invention. Examples of such a computer system as used here include an OS and a hardware component such as peripheral devices or the like.

Also, the "computer system" encompasses website providing environments (or display environments) that employ the WWW (World Wide Web) system. Also, the aforementioned program may be transmitted to other computer systems from a given computer system that stores this program in its storage apparatus or the like via a transmission medium or otherwise transmission waves in the transmission medium. The "transmission medium" as used here to transmit a program represents a medium having a function of transmitting information, examples of which include networks (communication networks) such as the Internet and communication lines (communication wires) such as phone lines, etc.

Also, the aforementioned program may be configured to provide a part of the aforementioned functions. Also, the aforementioned program may be configured as a so-called differential file (differential program), which is to be combined with a different program stored beforehand in a computer system in order to provide the aforementioned functions.

It should be noted that although detailed description has been made regarding the embodiments and examples of the present invention with reference to the drawings, specific configurations thereof are not restricted to these embodiments and examples. Rather, various changes of design or the like may be made, which are encompassed by the present invention without departing from the spirit or scope of the present invention.

REFERENCE SIGNS LIST 10 sewing machine system, 100 sewing machine, 101 sewing-machine-side display unit (e.g., one or more processors, computer program, or a combination thereof), 102 operation unit (e.g., one or more processors, computer program, or a combination thereof), 103 operation state ascertaining unit (e.g., one or more processors, computer program, or a combination thereof), 104 operation-associated content information storage unit (e.g., one or more memories), 105 content information selection unit (e.g., one or more processors, computer program, or a combination thereof), 106 instruction information appending unit (e.g., one or more processors, computer program, or a combination thereof), 107 instruction content validity judgment unit (e.g., one or more processors, computer program, or a combination thereof), 108 screen transition ascertaining unit (e.g., one or more processors, computer program, or a combination thereof), 109 history information storage unit (e.g., one or more memories), 110 coding unit (e.g., one or more processors, computer program, or a combination thereof), 200 terminal apparatus, 201 terminal-side display unit, 202 display control unit (display controller), 203 reader unit (reader), 204 reader control unit (reader controller), 205 code recognition unit (e.g., one or more processors, computer program, or a combination thereof), 206 screen code judgment unit (e.g., one or more processors, computer program, or a combination thereof), 207 history judgment unit (e.g., one or more processors, computer program, or a combination thereof), 208 content storage unit (e.g., one or more memories), 209 content acquisition unit (e.g., one or more processors, computer program, or a combination thereof).

The invention claimed is:

1. A sewing machine comprising:
an operation state ascertaining unit that ascertains an operation state of a sewing machine main body;
an operation-associated content information storage unit that stores a plurality of content information corresponding to the operation state;
a content information selection unit that selects content information that corresponds to the operation state ascertained by the operation state ascertaining unit from among the plurality of content information stored in the operation-associated content information storage unit; and
an instruction information appending unit that appends information with respect to instruction content for the sewing machine main body to the content information selected by the content information selection unit,
wherein the sewing machine generates corded information and causes the corded information to be displayed, the corded information corresponding to the operation state.

2. The sewing machine according to claim 1, comprising an instruction content validity judgment unit that judges a validity of instruction content for the sewing machine main body based on the operation state.

3. The sewing machine according to claim 2, wherein the instruction information appending unit further appends information with respect to the validity of the instruction content for the sewing machine main body after the instruction information is judged by the instruction content validity judgment unit.

4. The sewing machine according to claim 1, wherein, when a change occurs in an operation situation of the sewing machine main body or in the instruction content for the sewing machine main body, the instruction information appending unit updates the information with respect to the selected content information or the information with respect to the instruction content for the sewing machine main body according to the change that has occurred.

5. The sewing machine according to claim 4, comprising a history information storage unit that stores, as history information, update information with respect to the content information or the information with respect to the instruction content for the sewing machine main body.

6. The sewing machine according to claim 5, wherein the instruction information appending unit appends the information with respect to the instruction content for the sewing machine main body to the selected content information based on the history information stored in the history information storage unit.

7. The sewing machine according to claim 1, comprising a coding unit that codes the information generated by the instruction information appending unit by appending additional information to the selected content information.

8. The sewing machine according to claim 7, comprising a display unit that displays the coded information.

9. A sewing machine comprising:
an operation state ascertaining unit that ascertains an operation state of a sewing machine main body;
an operation-associated content information storage unit that stores a plurality of content information corresponding to the operation state;
a content information selection unit that selects content information that corresponds to the operation state ascertained by the operation state ascertaining unit from among the plurality of content information stored in the operation-associated content information storage unit;
an instruction information appending unit that appends information with respect to instruction content for the sewing machine main body to the content information selected by the content information selection unit; and
an instruction content validity judgment unit that judges a validity of instruction content for the sewing machine main body based on the operation state,
wherein the instruction information appending unit further appends information with respect to the validity of the instruction content for the sewing machine main body after the instruction information is judged by the instruction content validity judgment unit.

10. A sewing machine comprising:

an operation state ascertaining unit that ascertains an operation state of a sewing machine main body;

an operation-associated content information storage unit that stores a plurality of content information corresponding to the operation state;

a content information selection unit that selects content information that corresponds to the operation state ascertained by the operation state ascertaining unit from among the plurality of content information stored in the operation-associated content information storage unit; and an instruction information appending unit that appends information with respect to instruction content for the sewing machine main body to the content information selected by the content information selection unit; and a history information storage unit, wherein:

when a change occurs in an operation situation of the sewing machine main body or in the instruction content for the sewing machine main body, the instruction information appending unit updates the information with respect to the selected content information or the information with respect to the instruction content for the sewing machine main body according to the change that has occurred; and the history information storage unit stores, as history information, update information with respect to the content information or the information with respect to the instruction content for the sewing machine main body, and wherein the instruction information appending unit appends the information with respect to the instruction content for the sewing machine main body to the selected content information based on the history information stored in the history information storage unit.

11. A sewing machine comprising:

an operation state ascertaining unit that ascertains an operation state of a sewing machine main body;

an operation-associated content information storage unit that stores a plurality of content information corresponding to the operation state;

a content information selection unit that selects content information that corresponds to the operation state ascertained by the operation state ascertaining unit from among the plurality of content information stored in the operation-associated content information storage unit;

an instruction information appending unit that appends information with respect to instruction content for the sewing machine main body to the content information selected by the content information selection unit;

a coding unit that codes the information generated by the instruction information appending unit by appending additional information to the selected content information; and a display unit that displays the coded information.

* * * * *